United States Patent
Yagyu

(10) Patent No.: US 11,936,280 B2
(45) Date of Patent: Mar. 19, 2024

(54) LIQUID-COOLED MOTOR

(71) Applicant: KUBOTA CORPORATION, Osaka (JP)

(72) Inventor: Sumio Yagyu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 414 days.

(21) Appl. No.: 17/341,902

(22) Filed: Jun. 8, 2021

(65) Prior Publication Data

US 2021/0296966 A1    Sep. 23, 2021

Related U.S. Application Data

(63) Continuation of application No. PCT/JP2020/024417, filed on Jun. 22, 2020.

(30) Foreign Application Priority Data

Jun. 27, 2019   (JP) .................... 2019-120304

(51) Int. Cl.
  *H02K 5/20*   (2006.01)
  *H02K 9/193*  (2006.01)

(52) U.S. Cl.
  CPC ............. *H02K 9/193* (2013.01); *H02K 5/203* (2021.01)

(58) Field of Classification Search
  CPC ............ H02K 1/193; H02K 1/32; H02K 1/20; H02K 9/16; H02K 9/19; H02K 9/18;
  (Continued)

(56) References Cited

U.S. PATENT DOCUMENTS 5,568,781 A    10/1996  Vaillancourt et al.
2012/0294733 A1*  11/2012  Yamada ................ F04C 29/028
                                                       417/63
(Continued)

FOREIGN PATENT DOCUMENTS

GB     874 748 A    8/1961
JP  2008-109817 A   5/2008
(Continued)

OTHER PUBLICATIONS

International Search Report issued in International Patent Application No. PCT/JP2020/024417, dated Aug. 25, 2020, along with English translation thereof.
(Continued)

*Primary Examiner* — Bryan R Perez
(74) *Attorney, Agent, or Firm* — Greenblum & Bernstein, P.L.C.

(57) ABSTRACT

A water jacket is attempted to include a means to provide high heat transfer between coolant and a side wall of a cooling passage to increase a heat transfer capacity thereof. A liquid-cooled motor includes a motor case, a motor provided in the motor case, a motor housing provided in the motor case, and a water jacket provided in the motor housing, the water jacket having a circular shape to allow coolant to flow in a circumferential direction. The water jacket includes a cooling passage in which the coolant flows, the cooling passage having a passage width reduced gradually, a coolant supply port to supply the coolant to the cooling passage, and a coolant drain port to drain the coolant from the cooling passage.

4 Claims, 3 Drawing Sheets

(58) Field of Classification Search
CPC ............ H02K 9/197; H02K 9/20; H02K 9/06; H02K 9/14; H02K 41/031; H02K 5/20; H02K 5/02; H02K 5/04; H02K 5/08
See application file for complete search history.

(56) References Cited

U.S. PATENT DOCUMENTS

2017/0362797 A1* 12/2017 Nakagawa ............ E02F 9/2075
2019/0393759 A1   12/2019 Huang et al.

FOREIGN PATENT DOCUMENTS

| JP | 5337417 B | 11/2013 |
| JP | 5547783 B | 7/2014 |
| JP | 2017-127118 A | 7/2017 |
| JP | 6374797 B | 8/2018 |

OTHER PUBLICATIONS

Supplementary European Search Report dated Jun. 13, 2023 in family memeber European application No. 20832274.3.

* cited by examiner

LIQUID-COOLED MOTOR

CROSS REFERENCE TO RELATED APPLICATIONS

This application is a continuation application of International Application No. PCT/JP2020/024417, filed on Jun. 22, 2020, which claims the benefit of priority to Japanese Patent Application No. 2019/120304, filed on Jun. 27, 2019. The entire contents of each of these applications are hereby incorporated herein by reference.

BACKGROUND OF THE INVENTION

Field of the Invention

The present invention relates to a liquid-cooled motor serving as a prime mover for driving and a power generator.

A rotating electric motor (a motor generator) that serves as a prime mover and a power generator is installed in a hybrid vehicle as well as in a working machine such as a skid steer loader and a compact track loader. A permanent magnet motor, which is compact and has high output, is usually used as the motor.

The permanent magnet motor is required to be protected from overheating in order to maintain normal operation. Accordingly, the permanent magnet motor requires a large cooling capacity per unit volume, and thus a highly efficient cooling system is desirable. For this reason, the permanent magnet motor employs a liquid cooling system that has a large cooling capacity per unit volume with high cooling efficiency.

Description of the Related Art

In Japanese Patent Publication No. 5337417, Japanese Patent Publication No. 5547783, and Japanese Patent Publication No. 6374797, a motor employing a liquid cooling system (hereinafter referred to as a liquid-cooled motor) includes a stator that forms magnetic paths at equal intervals in a circumferential direction, a motor case that is fitted to an outer circumferential surface of the stator, and a water jacket provided between the outer circumferential surface of the stator and an inner circumferential surface of the motor case. The water jacket is provided with a passage through which cooling liquid flows in the circumferential direction or in an axial direction.

In Japanese Patent Publication No. 5337417, a cooling mechanism of an electric motor/generator includes a hollow cooling jacket, an outer case, a cooling fluid, and an O-ring for sealing. The cooling jacket is constituted of a cast helical groove portion formed on an outer surface, the cast helical groove portion allows fluid to circulate through passage grooves formed/sealed by the outer case. The helical groove portion of the cooling jacket is further constituted of a number of cooling passages or passage grooves that are formed by being "bent" or "stepped".

In Japanese Patent Publication No. 5547783, a first cooling water passage in a water jacket is continuous with a predetermined length in a circumferential direction, has one end side connected to a cooling water inlet port, and has the other end side connected to a cooling water outlet port. In addition, a first cooling water passage is constituted of a plurality of vertical passages, upper horizontal passages, and lower horizontal passages, and meanders up and down, respectively.

In Japanese Patent Publication No. 6374797, a water jacket is formed of aluminum alloy with high thermal conductivity to have a cylindrical shape, and has inside a jacket passage having a zigzag-shape in a circumferential direction. The jacket passage is formed of a plurality of straight holes formed along an axial direction through drilling parallel in the circumferential direction, adjoining straight holes are communicated with one ends thereof by a communication groove, and the other end of each of the adjoining straight holes is communicated with the other end of another adjoining straight hole by another communication groove.

SUMMARY OF THE INVENTION

A liquid-cooled motor includes a motor case, a motor provided in the motor case, a motor housing provided in the motor case, and a water jacket provided in the motor housing, the water jacket having a circular shape to allow coolant to flow in a circumferential direction. The water jacket includes a cooling passage in which the coolant flows, the cooling passage having a passage width reduced gradually, a coolant supply port to supply the coolant to the cooling passage, and a coolant drain port to drain the coolant from the cooling passage.

The cooling passage includes at least one straight passage having the passage width reduced as extending in a flow direction, a nozzle portion provided at a first end of the at least one straight passage, and a wide portion provided at a second end of the at least one straight passage, the wide portion having a passage width wider than the first end of the at least one straight passage.

The liquid-cooled motor includes a jet collision wall to which the coolant flowing to the wide portion through the nozzle portion collide, the jet collision wall being provided between the nozzle portion and the wide portion.

The at least one straight passage includes a plurality of straight passages extending in the circumferential direction of the water jacket and juxtaposed in an axial direction of the water jacket. In the plurality of straight passages juxtaposed in the axial direction of the water jacket, the adjoining straight passages are connected to each other via the nozzle portion and the wide portion.

The water jacket includes a side wall extending in the axial direction of the water jacket. The coolant supply port and the coolant drain port are arranged on both sides of the side wall to be adjacent to each other in the circumferential direction.

A distance L between the nozzle portion and the jet collision wall is greater than a diameter D of the nozzle portion.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
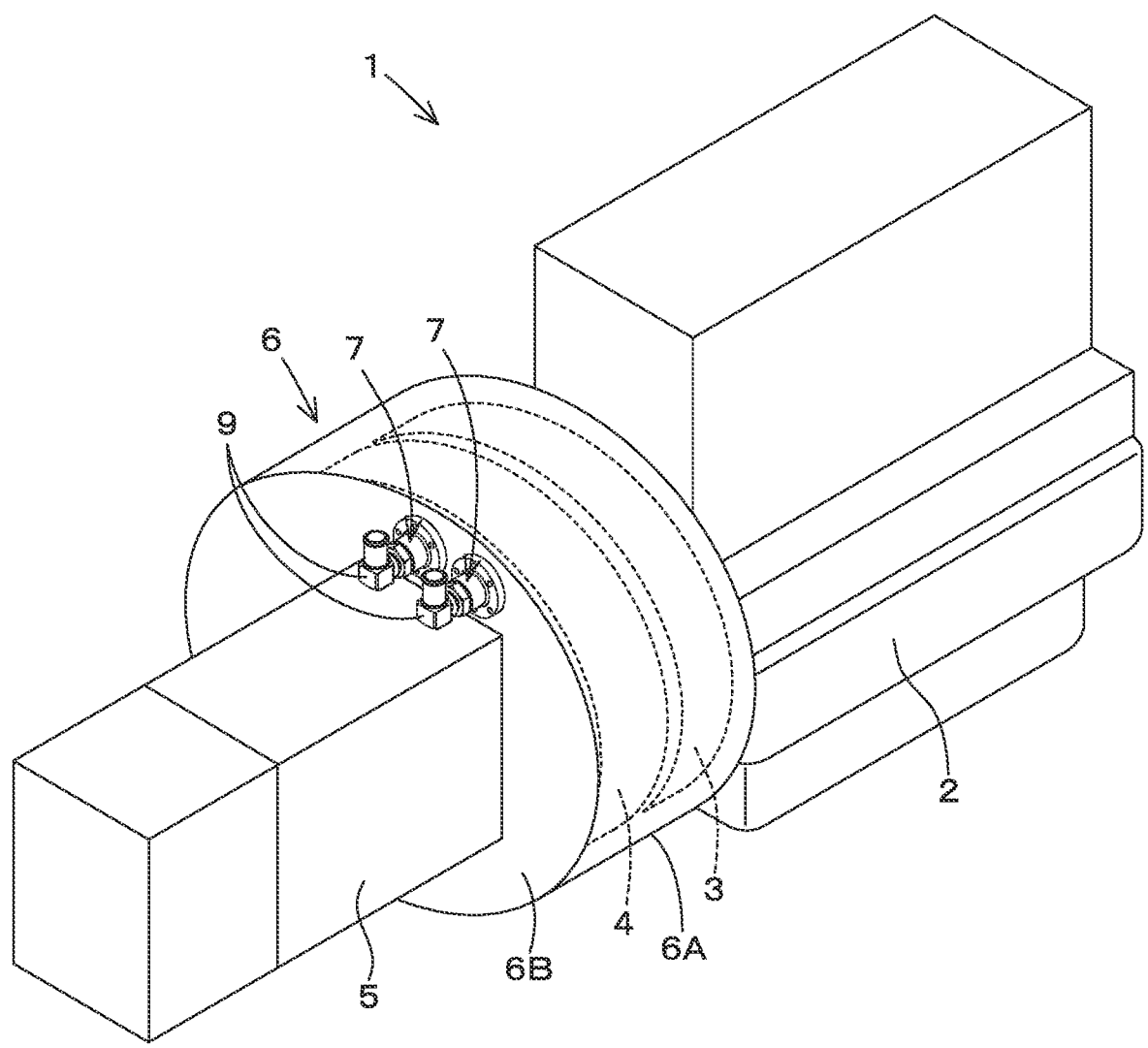
FIG. 1 is a perspective view schematically illustrating an outline of a power transmission mechanism including a liquid-cooled motor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Referring to the drawings, a liquid-cooled motor 4 and a water jacket 10 provided with the liquid-cooled motor 4 according to an embodiment of the present invention will be described below.

The embodiment described below is a concrete example of the present invention, and the concrete example does not limit the configuration of the present invention.

The liquid-cooled motor 4 of the present invention includes a motor generator 4. The liquid-cooled motor 4 of the present invention to be described below is installed in an industrial machine (agricultural machine, construction machine, working machine, UV, engine generator, and the like), a drive motor for various types of machines, an electric generator, or the like. That is, the liquid-cooled motor 4 of the present invention is adaptable to various types of machines that are not limited.

FIG. 1 schematically illustrates a power transmission mechanism 1. In the present embodiment, the power transmission mechanism 1 having a parallel hybrid configuration is exemplified.

Referring to FIG. 1, an outline of the power transmission mechanism 1 including the motor generator 4, which serves as the liquid-cooled motor 4 of the present invention, will be described. The liquid-cooled motor 4 of the present invention constitutes the power transmission mechanism 1 of a working machine, for example.

As shown in FIG. 1, the power transmission mechanism 1 includes an engine 2, a flywheel 3, and a motor generator 4. The power transmission mechanism 1 transmits selectively either one of power of the engine 2 and power of the motor generator 4, or both in combination, to a hydraulic pump 5 that is an example of a driven device.

The engine 2 is a diesel engine, a gasoline engine, or the like. A crankshaft of the engine 2 protrudes toward the hydraulic pump 5, and the flywheel 3 is connected to a tip end of a crankshaft (on the hydraulic pump 5 side).

The flywheel 3 is substantially in a shape of a disk, and is formed of material having a large mass (for example, metal such as cast iron). The crankshaft of the engine 2 is connected to the center of the flywheel 3. The flywheel 3 is surrounded by a flywheel housing.

The motor generator 4 is located on the hydraulic pump 5 side of the flywheel 3. The motor generator 4 is located inside a motor case 6. The motor case 6 includes a cylindrical portion 6A surrounding an outer circumference of the motor generator 4, and an end surface portion 6B provided at an end portion of the cylindrical portion 6A on the hydraulic pump 5 side.

The motor generator 4 includes a rotor and a stator. As the motor generator 4, a three-phase AC synchronous motor with permanent magnets embedded is suitably used, but other types of synchronous motors may also be used.

When the motor generator 4 functions as an electric generator, the rotor receives rotational power of the flywheel 3. On the other hand, when the motor generator 4 functions as an electric motor, the rotor provides rotational power to the flywheel 3. That is, the motor generator 4 receives rotational power through the flywheel 3.

The hydraulic pump 5, which is the driven device, is driven by the power received from at least one of the engine 2 and the motor generator 4. The hydraulic pump 5 can be specifically exemplified by a hydraulic pump of a hydrostatic transmission.

In the power transmission mechanism 1 of the working machine having the above-mentioned schematic configuration, the motor generator 4, which is a liquid-cooled motor of the present invention, is provided with a cooling structure (water jacket 10) inside.

Next, the water jacket 10 provided to the motor generator 4, which is the liquid-cooled motor 4 of the present invention, will be described in more detail.

An inverter device and a stator wiring inside the motor generator 4 are electrically connected to each other via a socket of a terminal base. The motor generator 4 includes a piping connector portion 7 serving as a piping adapter to connect the water jacket 10 provided inside and a cooling piping (outer pipe 9) provided outside. A coolant pump and an internal coolant piping (inner pipe 8) of the motor generator 4 are connected to each other via the piping connector portion 7.

Figure 2:
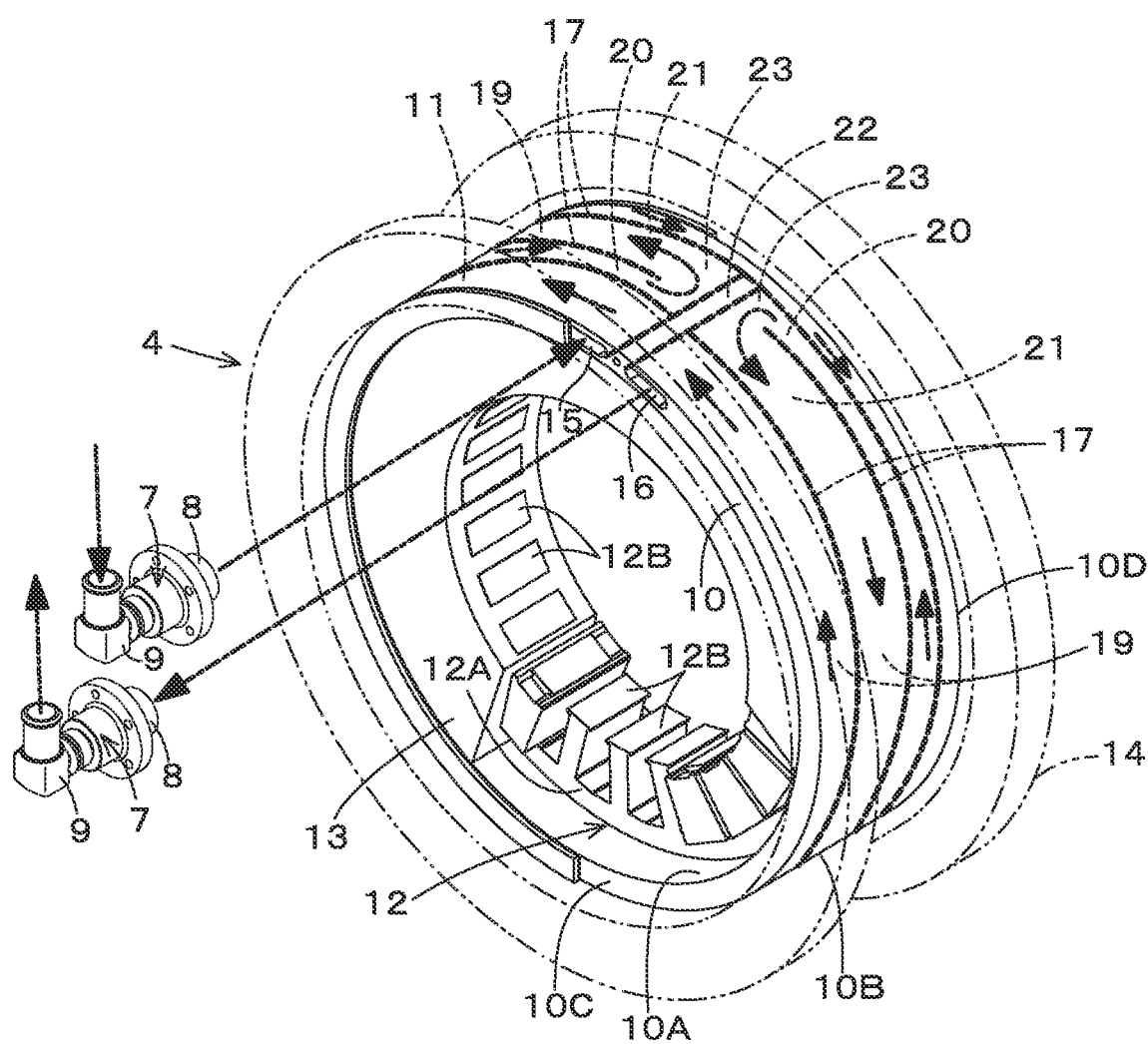
FIG. 2 is a perspective view illustrating a water jacket (cooling structure) included in the liquid-cooled motor of the present invention.

FIG. 2 shows a perspective view (partially an exploded perspective view) of the motor generator 4 on a stator side, after the motor case 6 is removed, and all but the cooling structure on the stator side is virtually removed from the motor generator 4 in the state shown in FIG. 1.

Referring to FIG. 2, a stator 12 of the motor generator 4 will be explained.

The motor generator 4 includes at least a water jacket 10, coils (not shown in the drawings), the stator 12, a thermal conductor 13, and a motor housing 14. The stator 12 having an annular shape is provided on an inner circumference of the water jacket 10.

The stator 12 includes a number of teeth 12B. Each of the coils is wound on each of the teeth 12B. The thermal conductor 13 covers the coils and the stator 12 and is provided on an inner circumferential surface of the water jacket 10. Inside the stator 12, a rotating shaft (not shown in the drawings) is provided, and a rotor having a cylindrical shape (not shown in the drawings) with permanent magnets embedded is arranged.

The stator 12 includes the plurality of teeth 12B arranged in a circumferential direction thereof, and protruding to an inner circumference side of a yoke 12A having an annular shape. Each of the teeth 12B is formed in a trapezoid shape such as to have a body on which the coil is wound via an insulating member. The thermal conductor 13 is molded entirely on the stator 12 with a resin having high thermal conductivity, leaving diametrically inward ends of the teeth 12B and the coils exposed.

The motor housing 14 is formed to have an annular shape. The water jacket 10 is formed to have an annular shape. An outer circumference diameter of the water jacket 10 is substantially the same as an inner circumference diameter of the motor housing 14. That is, the water jacket 10 is fitted to the inner circumference of the motor housing 14.

The motor generator 4 of the present invention is characterized in the configuration of the water jacket 10.

The water jacket 10 includes an inner circumferential wall 10A, an outer circumferential wall 10B, a connecting wall 10C, and a connecting wall 10D.

The inner circumferential wall 10A is formed to have a cylindrical shape, and is arranged on an outer circumference of the stator 12. The outer circumferential wall 10B is formed to have a cylindrical shape, and is arranged to surround an outer circumferential of the inner circumferential wall 10A. That is, the outer circumferential wall 10B is arranged on an outer circumference of the inner circumferential wall 10A with a certain interval.

The connecting wall 10C is formed to have an annular shape, and connects one side edge of the inner circumferential wall 10A to one side edge of the outer circumferential wall 10B. The connecting wall 10D is formed to have an annular shape, and connects the other side edge of the inner circumferential wall 10A to the other side edge of the outer circumferential wall 10B.

The connecting wall 10C and the connecting wall 10D connect the inner circumferential wall 10A and the outer circumferential wall 10B to each other to form a space in the water jacket 10 where coolant flows.

The water jacket 10 includes a cooling passage 11, a coolant supply port 15, and a coolant drain port 16. The cooling passage 11 is provided in an inner space of the water jacket 10.

Figure 3:
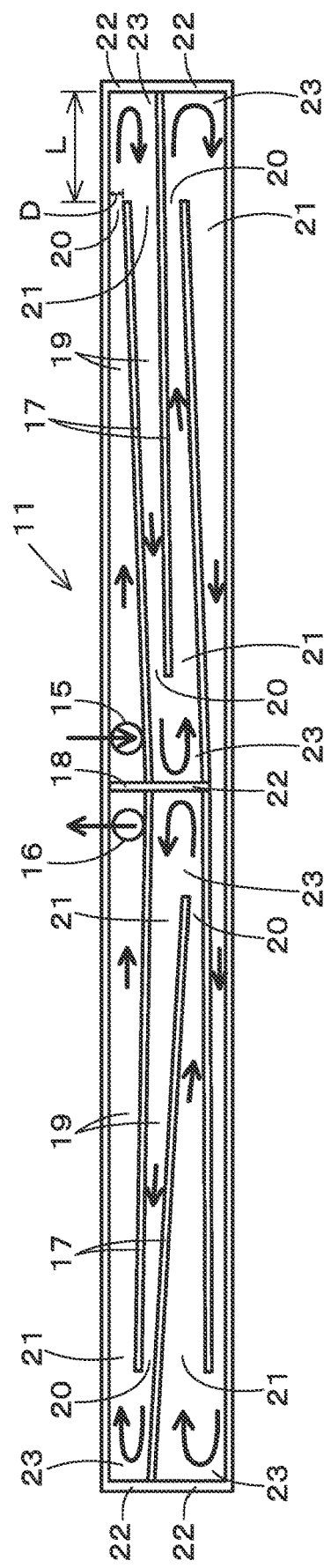
FIG. 3 is a view schematically illustrating a structure of a cooling flow passage provided in the water jacket of the present invention.

FIG. 3 schematically shows a structure of the cooling passage 11 provided in the water jacket 10. FIG. 3 is a planarly exploded view of the cooling passage 11 wound around the water jacket 10. The illustrated configuration and shape of the cooling passage 11 are just examples, to which the configuration and shape of the cooling passage 11 are not limited. In FIG. 3, the left-and-right direction is defined as a circumferential direction of the water jacket 10, and the up-and-down direction is defined as an axial direction of the water jacket 10.

As shown in FIG. 3, the cooling passage 11 is formed straight in the circumferential direction. The cooling passage 11 is divided into a plurality of passages by side walls 17 extending diagonally in the circumferential direction. The side walls 17 oriented in the circumferential direction connect the inner circumferential wall 10A and the outer circumferential wall 10B. That is, each of the side walls 17 is a plate that partitions the space provided inside the water jacket 10. The cooling passage 11 gradually reduces its passage width for allowing the flow of coolant.

The coolant supply port 15 supplies the coolant to the cooling passage 11. The coolant drain port 16 drains the coolant, after cooling, from the cooling passage 11 to the outside. The coolant supply port 15 and the coolant drain port 16 are located at the center in the circumferential direction (a longitudinal direction).

The coolant supply port 15 and the coolant drain port 16 are arranged on both sides of the side wall 18 extending in the axial direction of the water jacket 10 to be adjacent to each other in the circumferential direction. The side wall 18 connects the inner circumferential wall 10A and the outer circumferential wall 10B to each other. That is, the side wall 18 is a plate that partitions the space inside the water jacket 10.

The cooling passage 11 includes straight passages 19, nozzle portions 20, and wide portions 21.

The side walls 17 extend in the circumferential direction to form the straight passages 19 each of which has a passage width gradually reduced as extending in a flow direction.

The side walls 17 extending in the circumferential direction are each tapered in plan view, and are juxtaposed at certain intervals in the axial direction. That is, every pair of side walls 17 extending in the circumferential direction define each straight passage 19 therebetween.

The straight passages 19 extend in the circumferential direction of the water jacket 10, and are juxtaposed in the axial direction of the water jacket 10. In the embodiment, four straight passages 19 juxtaposed in the axial direction of the water jacket 10 are provided on the coolant supply port 15 side, and other four straight passages 19 juxtaposed in the axial direction are provided on the coolant drain port 16 side, respectively.

Five or more straight passages 19 may be juxtaposed in the axial direction of the water jacket 10. That is, the straight passages 19 are not limited to the example shown in FIG. 3.

In every pair of straight passages 19 adjoining in the axial direction, flow directions of the coolant are opposite each other. That is, when the coolant finishes passing through the first one of the straight passages 19, the coolant turns in a U-shape to flow in the opposite direction, and then enters the second one of the straight passages 19.

The straight passages 19 are provided at first ends thereof with the nozzle portion 20 narrowed in width, respectively.

The nozzle portions 20 are outlets for the coolant that has passed through the respective straight passages 19. The nozzle portions 20 are narrowed by the side walls 17 extended in the circumferential direction and tapered in plan view. The nozzle portions 20 speed up the flows of pressurized coolant and allow the coolant to pass therethrough.

The straight passages 19 are provided at second ends thereof with the wide portions 21 that have passage widths greater than those of the first ends of the straight passages 19. That is, the wide portions 21 are formed to have diffuser shapes with the passage widths widened.

The wide portions 21 are inlets for the coolant that has collided with jet collision walls 22, which will be described later.

The side walls 17 extending in the circumferential direction are arranged to have a tapered passage therebetween when viewed in plan, so that the widest portion of the tapered passage is defined as each wide portion 21. The wide portions 21 restore the pressure of the coolant liquid flow that has lowered.

In adjoining ones of the straight passages 19 juxtaposed in the axial direction of the water jacket 10, the nozzle portion 20 and the wide portion 21 are joined to each other to connect the adjoining straight passages 19 to each other. In other words, the nozzle portion 20 and the wide portion 21 are joined to each other by the straight passages 19.

The cooling passage 11 includes the jet collision walls 22 with which the coolant passing through the nozzle portions 20 and heading for the wide portions 21 collides, and each of the jet collision walls 22 is provided between the nozzle portion 20 and the wide portion 21.

The jet collision walls 22 define respective accumulation chambers 23 in which the coolant having flown out of the respective nozzle portions 20 is temporarily accumulated. The jet collision walls 22 connect the inner circumferential wall 10A to the outer circumferential wall 10B. That is, the jet collision walls 22 are plates that partition the space inside the water jacket 10.

Each of the jet collision walls 22 changes the flow direction of the coolant having flown out of the nozzle portion 20 to the wide portion 21. That is, each of the jet collision walls 22 is provided between the nozzle portion 20 and the wide portion 21. The jet collision walls 22 extend in the axial direction to define end surfaces of the cooling passage 11. The coolant becomes a high-speed jet when it passes through the nozzle portions 20, and the high-speed jet collides with the jet collision walls 22.

In particular, the nozzle portions 20 lead to the jet collision walls 22, the jet collision walls 22 lead to the wide portions 21, and the wide portions 21 lead to the straight passages 19. In other words, each nozzle portion 20 and the wide portion 21 next to the nozzle portion 20 adjoin each other in the axial direction.

Each of the jet collision walls 22 is provided outward in the circumferential direction from each nozzle portion 20 and the wide portion 21 next to the nozzle portion 20. It can be said that each nozzle portion 20 the corresponding jet collision wall 22, and the corresponding wide portion 21 are arranged in a U-shape, in which the jet collision wall 22 defines the bottom portion of the U-shape.

The straight passage 19, the nozzle portion 20, the jet collision wall 22, and the wide portion 21 are arranged in a sequence, and the cooling passages 11 includes the sequences. The sequences of the straight passage 19, nozzle portion 20, jet collision wall 22, and wide portion 21 are juxtaposed in the axial direction of the water jacket 10. In addition, the sequences of straight passage 19, nozzle portion 20, jet collision wall 22, and wide portion 21 are juxtaposed in the circumferential direction of the water jacket 10.

The cooling passage 11 extends straight in the circumferential direction and zigzags in the axial direction. The cooling passage 11 ranges over the whole length between both axial end surfaces of the water jacket 10.

A distance L between a tip end of each nozzle portion 20 and the corresponding jet collision wall 22 is greater than a diameter D of each nozzle portion 20 (see FIG. 3).

In order to circulate the coolant in the cooling passage 11 configured in the above-mentioned manner, at least one coolant supply port 15 and at least one coolant drain port 16 are provided in the cooling passage 11.

In the embodiment, the coolant supply port 15 is provided on an upper left side in FIG. 2. In addition, the coolant drain port 16 is provided on an upper right side in FIG. 2. The coolant supply port 15 and the coolant drain port 16 are arranged on both sides of the side wall 18 extending in the axial direction of the water jacket 10 and are adjacent to each other in the circumferential direction.

The coolant supply port 15 and the coolant drain port 16 may be exchanged by swapping the left and right sides when the cooling passage 11 is formed so that the flow direction of the coolant is in the opposite direction (when the flow path is reversed).

The coolant supply port 15 and the coolant drain port 16 are connected to a circulation device (e.g., a coolant pump) provided outside the motor generator 4 via the piping connector portion 7. The circulation device causes liquid coolant such as water or oil to circulate in the cooling passage 11.

The coolant supply port 15 is connected to the inner pipe 8. The inner pipe 8 is connected to the outer pipe 9 via the piping connector portion 7. In addition, the coolant drain port 16 is connected to the inner pipe 8. The inner pipe 8 is connected to the outer pipe 9 via the piping connector portion 7.

Next, circulation of the coolant in the cooling passage 11 of the water jacket 10 will be described with reference to FIG. 2 and FIG. 3.

In FIG. 2 and FIG. 3, the flow direction of the coolant (circulation path of the cooling passage 11) is indicated by black arrowed lines.

Specifically, as shown in FIG. 2 and FIG. 3, the coolant delivered from a coolant pump reaches the coolant supply port 15 through the outer pipe 9, the piping connector portion 7, and the inner pipe 8 provided on the coolant supply port 15 side.

The coolant supplied into the cooling passage 11 from the coolant supply port 15 into the cooling passage 11 is pressurized as flowing in the gradually narrowing straight passage 19. The pressurized coolant flows to the nozzle portion 20, and the coolant flow speeds up in the nozzle portion 20 and passes through the nozzle portion 20. A high-speed jet of the coolant enters the accumulation chamber 23, and collides with the jet collision wall 22. Here, the coolant reverses the flow direction thereof, and flows to the wide portion 21. The jet collision wall 22 reduces the pressure of the coolant.

That is, the coolant from the nozzle portion 20 collides with the jet collision wall 22 to change the flow direction thereof, and then reversely turns toward the wide portions 21, thereby flowing in a U-shaped direction (like a U-turn).

The reduced pressure of the coolant is restored at the wide portion 21. After passing through the wide portion 21, the coolant flows to the next nozzle portion 20 through the straight passage 19, thereby being pressurized. When passing through the nozzle portion 20, the coolant becomes the high-speed jet, enters the accumulation chamber 23, and collides with the next jet collision wall 22. The pressure of the coolant is lowered at the jet collision wall 22. The coolant reverses the flow direction thereof, and flows to the next wide portion 21. The coolant restores the pressure thereof in the next wide portion 21.

In this manner, the coolant flows reciprocally in the circumferential direction in the cooling passage 11. The coolant repeats the above-mentioned circulation, and then reaches the coolant drain port 16. After reaching the drain port, the coolant is passed through the inner pipe 8, the piping connector portion 7, and the outer pipe 9 provided on the coolant drain port 16 side, and reaches the coolant pump.

The coolant circulates in the cooling passage 11 of the water jacket 10 in the flow process described above.

As described above, the liquid-cooled motor 4 of the present invention includes the means to obtain a high thermal transfer between the coolant and the side walls 17 and 22 of the cooling passage 11 (that is, the cooling passage 11 including the straight passages 19 whose passage widths are narrowed as extending in the flow directions, the nozzle portions 20 provided at first ends of the straight passages 19, the jet collision walls 22 with which the coolant from the nozzle portions 20 collides, and the wide portions 21 provided at second ends of the straight passages 19 and having passage widths that are larger than those of the first ends of the straight passages 19), thereby improving the thermal transfer to increase the amount of heat transferred.

In particular, at the jet collision walls 22, a high heat transfer rate can be obtained due to intensity of the vortex turbulence, which is higher than the wall heat transfer rate at the normal forced convection.

In addition, the cooling passage 11 has a part whose width is gradually narrowed as extending in the flow direction between the nozzle portion 20 and the wide portion 21. In this way, the width of the cooling passage 11 is inconstant, but the wall heat transfer rate due to the normal forced convection can be obtained on average except for the jet collision walls 22.

In addition, in the cooling passage 11 which is continuously inconstant in width, the heat transfer rate at the side walls 17 and 22 in the cooling passage 11 which is continuously inconstant in width exceeds the heat transfer rate of a cooling passage which is constant in width, thereby increasing the overall heat transfer coefficient of the heat radiation path from the outer circumference of the stator to the water jacket 10.

Accordingly, that configuration can eliminate the problem that the heat transfer in the water jacket 10 is restricted to limit the cooling capacity.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A liquid-cooled motor comprising:
    a motor case;
    a motor provided in the motor case;
    a motor housing provided in the motor case; and
    a water jacket provided in the motor housing, the water jacket having a circular shape to allow coolant to flow in a circumferential direction, wherein
    the water jacket includes
        a cooling passage in which the coolant flows, the cooling passage having a passage width reduced gradually,
        a coolant supply port to supply the coolant to the cooling passage, and
        a coolant drain port to drain the coolant from the cooling passage,
    the cooling passage includes
        at least one straight passage having the passage width reduced as extending in a flow direction,
        a nozzle portion provided at a first end of the at least one straight passage, and
        a wide portion provided at a second end of the at least one straight passage, the wide portion having a passage width wider than the first end of the at least one straight passage,
    the at least one straight passage includes a plurality of straight passages extending in the circumferential direction of the water jacket and juxtaposed in an axial direction of the water jacket, and
    in the plurality of straight passages juxtaposed in the axial direction of the water jacket, the adjoining straight passages are connected to each other via the nozzle portion and the wide portion.

2. The liquid-cooled motor according to claim 1, comprising
    a jet collision wall to which the coolant flowing to the wide portion through the nozzle portion collides, the jet collision wall being provided between the nozzle portion and the wide portion.

3. The liquid-cooled motor according to claim 2, wherein
    a distance L between the nozzle portion and the jet collision wall is greater than a diameter D of the nozzle portion.

4. The liquid-cooled motor according to claim 1, wherein
    the water jacket includes
    a side wall extending in the axial direction of the water jacket, and
    the coolant supply port and the coolant drain port are arranged on both sides of the side wall to be adjacent to each other in the circumferential direction.

* * * * *